United States Patent [19]

Truc et al.

[11] Patent Number: 4,765,734
[45] Date of Patent: Aug. 23, 1988

[54] DIGITALLY ENCODED ALPHA-NUMERIC PROJECTOR SLIDE AND SYSTEMS FOR USING THE SAME

[75] Inventors: James A. Truc, Wayzata; Gary A. Hoonsbeen, Crystal, both of Minn.

[73] Assignee: Pakon, Inc., Minnetonka, Minn.

[21] Appl. No.: 866,214

[22] Filed: May 22, 1986

[51] Int. Cl.⁴ .............................................. G03B 31/06
[52] U.S. Cl. .................................... 353/121; 353/120; 353/19
[58] Field of Search ..................................... 353/15–19, 353/120, 121, 122, 27 R; 360/2; 40/158

[56] References Cited

U.S. PATENT DOCUMENTS

| | | |
|---|---|---|
| 3,095,034 | 6/1963 | Eagle et al. . |
| 3,176,580 | 4/1965 | Metz . |
| 3,238,842 | 3/1966 | Wiklund et al. . |
| 3,350,983 | 11/1967 | Gerry . |
| 3,352,204 | 11/1967 | Staar . |
| 3,509,651 | 5/1970 | Robbins et al. ............... 353/27 R X |
| 3,594,076 | 7/1971 | Lieltis . |
| 3,691,312 | 9/1972 | Petersen . |
| 3,779,637 | 12/1973 | Otsuboj . |
| 3,784,296 | 1/1974 | Davis . |
| 3,790,266 | 2/1974 | Veda et al. ........................ 353/27 R |
| 3,807,851 | 4/1974 | Knox et al. ........................ 353/120 |
| 3,876,297 | 4/1975 | Appeldorn et al. . |
| 3,879,117 | 4/1975 | Damlamian . |
| 3,883,238 | 5/1975 | Dimitracopoulos . |
| 3,943,563 | 3/1976 | Lemelson ........................ 360/2 X |
| 4,014,604 | 3/1977 | Schwartz . |
| 4,102,569 | 7/1978 | Schwartz . |
| 4,223,463 | 9/1980 | Good . |
| 4,270,853 | 6/1981 | Hatada et al. . |
| 4,554,591 | 11/1985 | Kee ...................................... 360/2 X |
| 4,592,042 | 5/1986 | Lemelson ........................... 360/2 X |

FOREIGN PATENT DOCUMENTS

| | | | |
|---|---|---|---|
| 0041523 | 3/1977 | Japan .................................... 353/88 |
| 0111108 | 7/1983 | Japan .................................... 360/2 |
| 1312679 | 4/1973 | United Kingdom . |

OTHER PUBLICATIONS

IBM Tech Disclosure Bulletin, vol. 21, #9, "Audio Recording on Magnetic Stripe Documents".
"Preserve Your Film Memories on Videocassettes", Synchronics, Holiday 1985, p. 8.
Brochure, Card Data Format, two pages.

Primary Examiner—Harry N. Haroian
Attorney, Agent, or Firm—Kinney & Lange

[57] ABSTRACT

The present invention includes an information projector slide comprising a planar member having a central window for holding a photographic film image and at least one border adjacent the window. A magnetic medium for storing selected digitally encoded alpha-numeric information is affixed to the border. A read/write system for reading information from and writing information to the projector slide includes a read head, a write head, a controller, a keyboard and a display monitor. An optical projection system and a video projection system are provided for concurrently displaying an image from a photographic slide and encoded information from the magnetic media. A cropping system is also provided for use with the video projection system.

14 Claims, 5 Drawing Sheets

DIGITALLY ENCODED ALPHA-NUMERIC PROJECTOR SLIDE AND SYSTEMS FOR USING THE SAME

BACKGROUND OF THE INVENTION

1. Field of the Invention

The present invention relates generally to a photographic projector slide, and is particularly concerned with a system for concurrently storing and retrieving information concerning images held in projector slides.

2. Description of the Prior Art

Photography is enjoyed by both professionals and amateurs, and continues to grow in popularity. Film for producing photographic slides is well-known and frequently selected by photographers.

Generally, a positive film image is developed and mounted in a projector slide frame. The projector slide frame is a flat, square member having a rectangular opening or window in its central portion. The frame is constructed from a rigid, economical material such as cardboard or plastic. A photographic film image is positioned in the window between the two panels in any desired manner.

Current methods of identifying images secured in a projector slide include manually printing or writing on a label affixed to a projector slide border. This process is slow and requires legible handwriting. A variation of such labeling includes affixing pre-typed labels to a border. However, large data capacity storage is not practical on such a label. Furthermore, machine readability of such a label is very costly and therefore not practical.

Devices are also made to type information directly on a slide frame border. Such devices are elaborate and have drawbacks which include limited storage capacity, difficulty of changing information and general lack of machine readability.

A conventional digital bar code could also be utilized to identify images held in a projector slide. While a bar code is machine readable, it has a low data capacity storage and it is difficult to change or add information once a bar code is printed.

Magnetic media (often as a stripe) for storing encoded information is well known. Conventional magnetic read and write heads are utilized for detecting and encoding desired information on a magnetic media. Information is easily encoded or changed. Common examples of the use of such magnetic media includes credit cards, band debit cards, tickets and security access cards.

U.S. Pat. No. 4,102,569, issued to Schwartz in July of 1978, describes a sound slide. A slide comprises a frame having a window in which a transparency is mounted in a conventional manner. One side of the slide is extended to accommodate a magnetic layer. There is a similar magnetic layer on the other side of the extended portion. The sound slide includes an arcuate sound track, a spiral-shaped sound track and other sound track configurations.

U.S. Pat. No. 4,014,604, issued to Schwartz in March of 1977, also discloses a sound slide. This sound slide is identical to that described above with reference to the U.S. Pat. No. 4,102,569 patent. The sound track portion is contiguous to the image bearing portion and has spiral, arcuate, parallel and sinuous track configurations.

U.S. Pat. No. 3,883,238, issued to Dimitracopoulos in May of 1975, discloses an audiovisual slide with an adjacent sound and information track. Each slide includes a slide mount and a sound or information track. The sound or information track is positioned on the projector slide in many different configurations. The sound or information track is parallel to an edge of the projector slide. There is no suggestion in this patent that alpha-numeric data can be digitally encoded onto the sound or information track.

U.S. Pat. No. 3,876,297, issued to Appeldorn et al. in April of 1977, discloses an apparatus for audio identification of a photographic transparency mounted in a slide frame. A projector is constructed for use with a slide frame clip having a base attached to a slide frame by an adhesive layer. The clip also includes a strip of magnetic tape which is affixed to a base. The magnetic tape is used for sound recording.

U.S. Pat. No. 3,807,851, issued to Knox et al. in April of 1974, is directed specifically to the slide identification clip for use with the system disclosed in the U.S. Pat. No. 3,876,297 patent discussed above. The clip is identical to that described in the U.S. Pat. No. 3,876,297. In a second embodiment, a base includes a bottom wall, a front wall, and a rear wall. The clip can be secured to a slide frame without the adhesive used in the other embodiment. A strip of magnetic tape is affixed to the front wall. A magnetic tape extends along the entire width of the slide frame.

U.S. Pat. No. 3,784,296, issued to Davis in January of 1974, discloses coding means for photographic slides. A coding member is fixed to an edge of a slide frame. Information is optically encoded in digital form onto a coding member. An apparatus identifies specific slides by the codes thereon, and selects the slide for projection.

Consequently, a need exists for improvements in identifying images or transparencies held in a projector slide. It is desirable that a system for storing and retrieving selected information concurrently with a projector slide have large data storage capacity, ease of changing information and machine readability. A system which uses projector slides capable of storing digital alpha-numeric information would be especially desirable.

SUMMARY OF THE INVENTION

The present invention includes an information encoded projector slide for holding a transparency and concurrently storing and retrieving desired information. A magnetic stripe on the projector slide has a large data storage capacity and is machine readable. Furthermore, encoded information can be retained for several decades, yet easily and conveniently changed when so desired.

The present invention includes an information projector slide comprising a planar frame having a central window for holding a photographic image and at least one border adjacent the window. A magnetic medium for storing selected digitally encoded alpha-numeric information is affixed to the border.

A read/write system for reading and writing digitally encoded information on an information projector slide includes a read head, a write head, an electronics board, a keyboard and a display monitor. An optical projection system and a video projection system are provided for concurrently displaying an image from a photographic slide and encoded information from the magnetic media. A cropping system is also provided for use with the video projection system.

DETAILED DESCRIPTION OF THE PREFERRED EMBODIMENTS

Figures 1, 3:
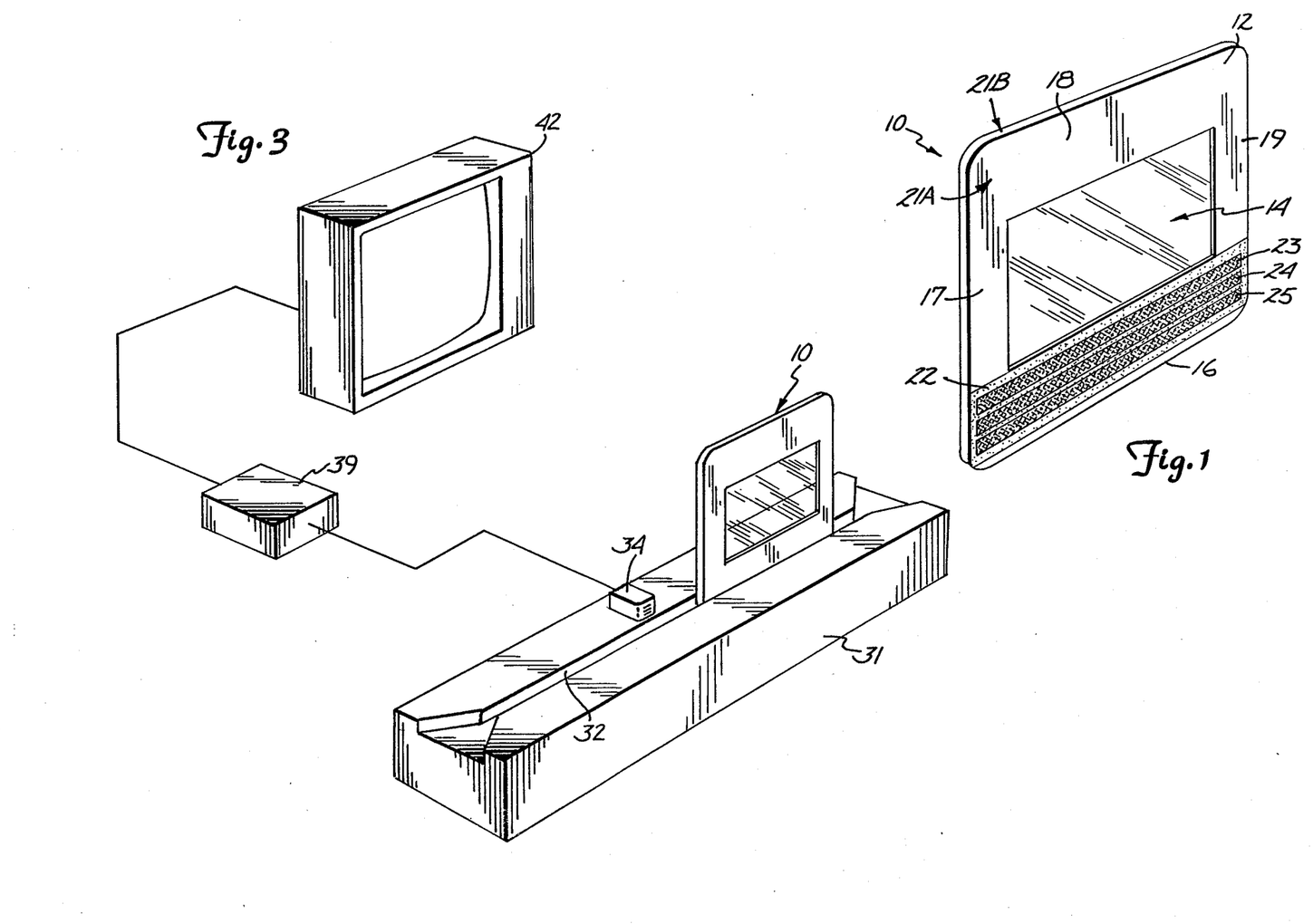
FIG. 1 is a perspective view of an embodiment of an information encoded projector slide in accordance with the present invention.
FIG. 3 is a schematic view of a read-only system for use with the information projector slide shown in FIG. 1.

An information projector slide in indicated generally at 10 in FIG. 1. Throughout the figures and embodiments, like reference numerals are used to indicate like elements. As shown, projector slide 10 includes a planar frame member 12, having an opening or window 14 in its central portion and at least one border 16 adjacent to window 14. In the embodiment illustrated in FIG. 1, projector slide 10 is a flat, square frame 12 having four borders 16, 17, 18, and 19. It is preferred that frame 12 be constructed from a rigid and economical material, such as cardboard or plastic. Window 14 is of sufficient size to mount a photographic image (not shown) in any suitable manner.

Projector slide 10 includes a first surface 21A and a second surface 21B. A photographic film image 20 (not shown) is secured in window 14 between surfaces 21A and 21B in any usual or preferred manner. In one preferred embodiment, projector slide 10 is a standard 35 mm projector slide.

On first surface 21A of projector slide 10, a magnetic medium or stripe 22 is affixed to border 16. Magnetic medium 22 is used for storing desired information, particularly alpha-numeric data. As illustrated in FIG. 1 magnetic medium 22 can include one or more tracks, such as 23, 24 and 25, for storing various data. Various methods of affixing magnetic medium 22 to projector slide 10 are within the scope of this invention. For example, magnetic medium 22 can be adhesively affixed to border 16. In a second example, magnetic medium 22 can be thermally bonded to border 16. In a third example, magnetic medium 22 can be applied in a liquid or semi-liquid state by wiping, spraying or brushing the surface of border 16. The liquid is allowed to cure in known manner to form a flat, dry magnetic medium 22.

Various types of data can be digitally encoded on magnetic medium 22. Encoded data includes, but is not limited to, a description of the photographic film image, date of the image, name of photographer, type of film used, a classification code, and cropping or other processing information. Magnetic medium 22 permits information to be stored concurrently with the projector slide. Such information can be used for cataloging and indexing the projector slides. For example, a random quantity of information encoded projector slides can be loaded in an apparatus capable of reading magnetic medium 22. The apparatus can sort and store the projector slides as desired.

Figure 2:
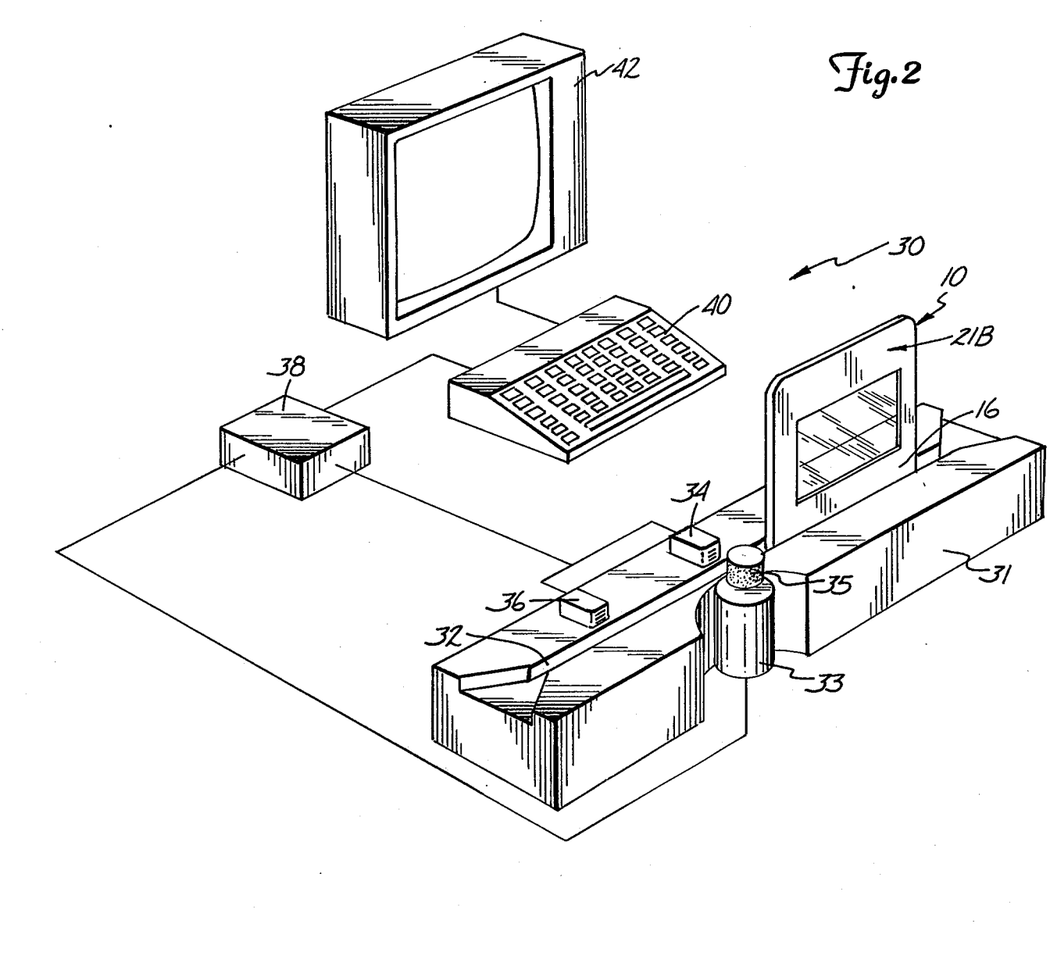
FIG. 2 is a schematic view of a read/write system for use with the information projector slide shown in FIG. 1.

A read/write system 30 for utilizing information projector slide 10 as described above is illustrated in the schematic diagram of FIG. 2. A carriage 31 for receiving projector slide 10 includes a slot track 32. Border 16 of projector slide 10 is positioned in slot 32. In FIG. 2, second surface 21B of projector slide 10 is shown. Magnetic medium 22 is on opposite side 21A (not shown) of projector slide 10 on border 16. A first or write head 34 is mounted on carriage 31 so that head 34 can be in contact with or very closely spaced from magnetic medium 22 of projector slide 10. A second or read head 36 is mounted on carriage 31 so that head 36 can be in contact with or very closely spaced from magnetic medium 22.

As magnetic medium 22 passes write head 34, data can be encoded thereon. As magnetic medium 22 passes read head 36, encoded data is read therefrom. Read and write heads 34 and 36, respectively, are magnetic pickup heads and are interfaced with read/write electronic circuitry 38. Read/write system 30 also includes a tachometer counter 33 which is interfaced to circuitry 38. As projector slide 10 passes by write head 34, roller 35 contacts surface 21B, and data representative of the speed at which projector slide 10 is moving is provided to circuitry 38. This speed data is utilized by circuitry 38 to properly write data onto magnetic medium 22. Circuitry 38 is interfaced with a keyboard 40 and a data display monitor 42. It will be understood that carriage 31, write and read heads 34 and 36, electronic circuitry 38, keyboard 40 and display monitor 42 can be packaged into an integral housing (not shown) as desired.

In operation, information to be encoded or written onto projector slide 10 is typed on keyboard 40 and simultaneously displayed on monitor 42. Selected information can be entered into predetermined fields (not shown). Each field has a selected length. The sum of all fields equals the storage capacity of magnetic medium 22.

Once information is displayed on monitor 42, projector slide 10 is positioned in slot 32. As magnetic medium 22 passes in contact with write head 34, the information is digitally encoded thereon. Projector slide 10 continues through slot 32 so that medium 22 makes contact with read head 36. Read head 36 detects the encoded information.

It is preferred that system 30 include a verification system. Memory within circuitry 38 (not shown) compares the encoded information written to medium 22 with information read by read head 36 to assure that it was properly encoded. A signal, such as a single audio beep, can issue from system 30 to indicate conformation. An indication such as a visual display provided through monitor 42 can issue to indicate an improper write operation. Additional passes through slot 32 are made until the information is properly encoded or written onto projector slide 10. Read head 36 also permits system 30 to detect previously encoded information, and display this information on monitor 42. Furthermore, previously encoded data on medium 22 can also be erased and replaced with new data.

In certain applications, it is desirable to have a read-only system for use with projector slide 10. With read-only capability, encoded information on medium 22 cannot be erased or changed. A read-only system is illustrated in the schematic diagram of FIG. 3. As described above, carriage 31 includes a slot 32 for receiving projector slide 10. Read head 36, mounted on carriage 31, is interfaced with read-only electronics 39 which in turn is interfaced with data display monitor 42. As medium 22 of projector slide 10 passes read head 34, encoded information from medium 22 is read by read head 34, decoded by electronics 39, and displayed on monitor 42. Electronics 39 can also be interfaced with a printer (not shown) or computer (not shown) so that displayed data can be printed or stored, respectively, as desired.

Figure 4:
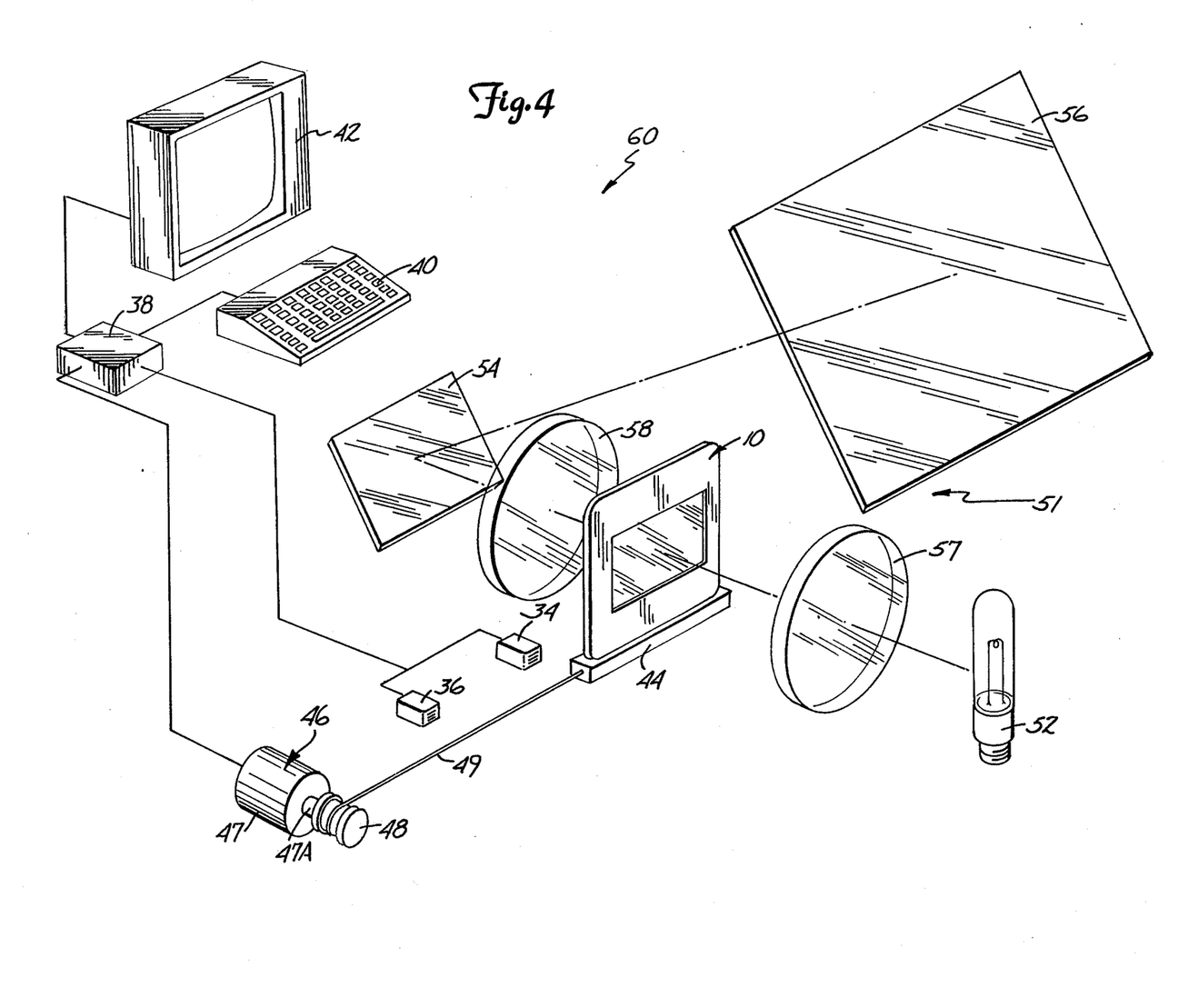
FIG. 4 is a schematic view of a read/write system having an optical image projection system for use with the information projector slide shown in FIG. 1.

In certain applications, it is desirable to view the image from photographic slide 10 concurrently with information displayed from medium 22. A third preferred embodiment of the data storage and retrieval system of the present invention, system 60, is illustrated in FIG. 4. A slidable carriage 44 is actuated by an electric drive system 46. Drive system 46 moves projector slide 10 across write and/or read heads 34 and 36, respectively, in response to commands from keyboard 40 through controller 38. Drive system 46 includes an electric motor 47, a take-up spool 48 mounted on an output shaft 47A of motor 47, and a guide wire 49 connected at a first end to spool 48 and at a second end to carriage 44. Other systems for moving projector slide 10 can also be used. As with read/write system 30 in FIG. 2, write head 34, read head 36, read/write electronics 38, keyboard 40 and data display monitor 42 are provided for encoding information on and displaying information from magnetic medium 22. A verification system as described above for read/write system 30 can also be included.

System 60 includes an optical reflection system 51 for viewing an image from photographic slide 10. A slight source such as lamp 52 is provided on one side of projector slide 10 so that an image mounted therein is projected to a mirror 54 and reflected to a screen 56. A diffuser 57 is provided between light source 52 and projector slide 10. A lens 58 is provided between projector slide 10 and mirror 54. Diffuser 57 and lens 58 are utilized to focus the image projected on screen 56 in known manner. It will be understood that the elements of system 60 can be packaged into an integral housing (not shown) if desired.

Figure 5:
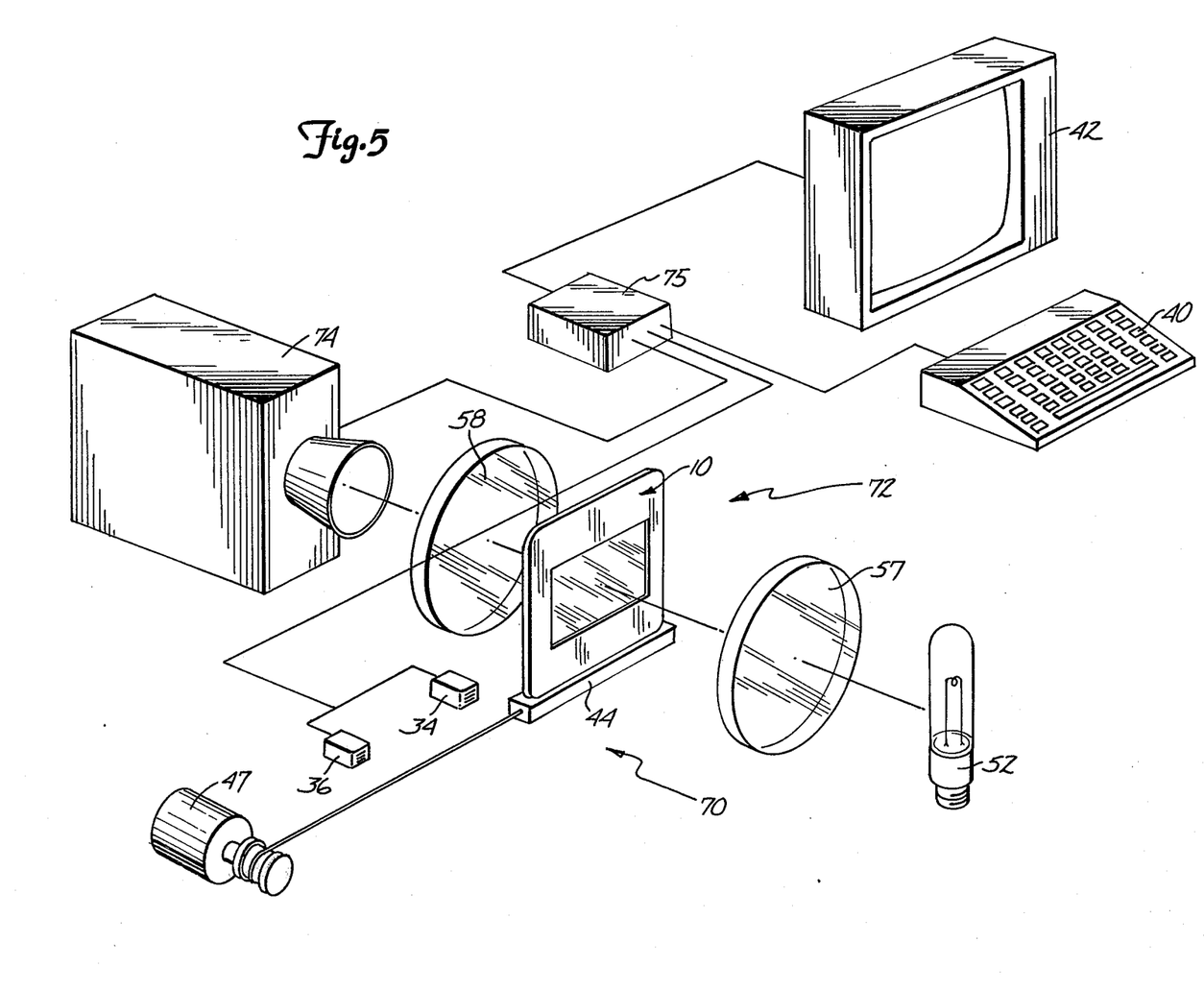
FIG. 5 is a schematic view of a read/write system having a video projection system for use with the information projector slide shown in FIG. 1.

A fourth preferred embodiment of the present invention, system 70, is illustrated in FIG. 5. In a manner similar to that described with reference to system 60, write and read heads 34 and 36 are positioned near a carriage 44 to respectively encode information on and read information from, magnetic medium 22 of projector slide 10. In system 70, a video projection system 72 concurrently displays an image from a projector slide 10 with information from magnetic medium 22. A video camera 74 receives an image from projector slide 10 created by a light source such as lamp 52, diffuser 57 and lens 58. A signal is sent from camera 74 to mixer/controller 75. Drive system 46 is also interfaced with keyboard 40 through mixer/controller 75, as shown, and functions in a manner previously described. Mixer/controller 75 is also interfaced with keyboard 40 to encode information onto, and read information from, magnetic medium 22 through write head 34 and read head 36, respectively. Mixer/controller 75 is interfaced with monitor 42 for simultaneous display of the image mounted in and information encoded on projector slide 10. It is preferred that camera 74, mixer 75 and monitor 42 are configured to invert negatives to positive images. This is of significance, since it permits the more frequently used photographic print (which produces color reversal negatives) for slides as well. It will be understood that the elements of system 70 can be packaged into an integral housing (not shown) if desired.

Figure 6:
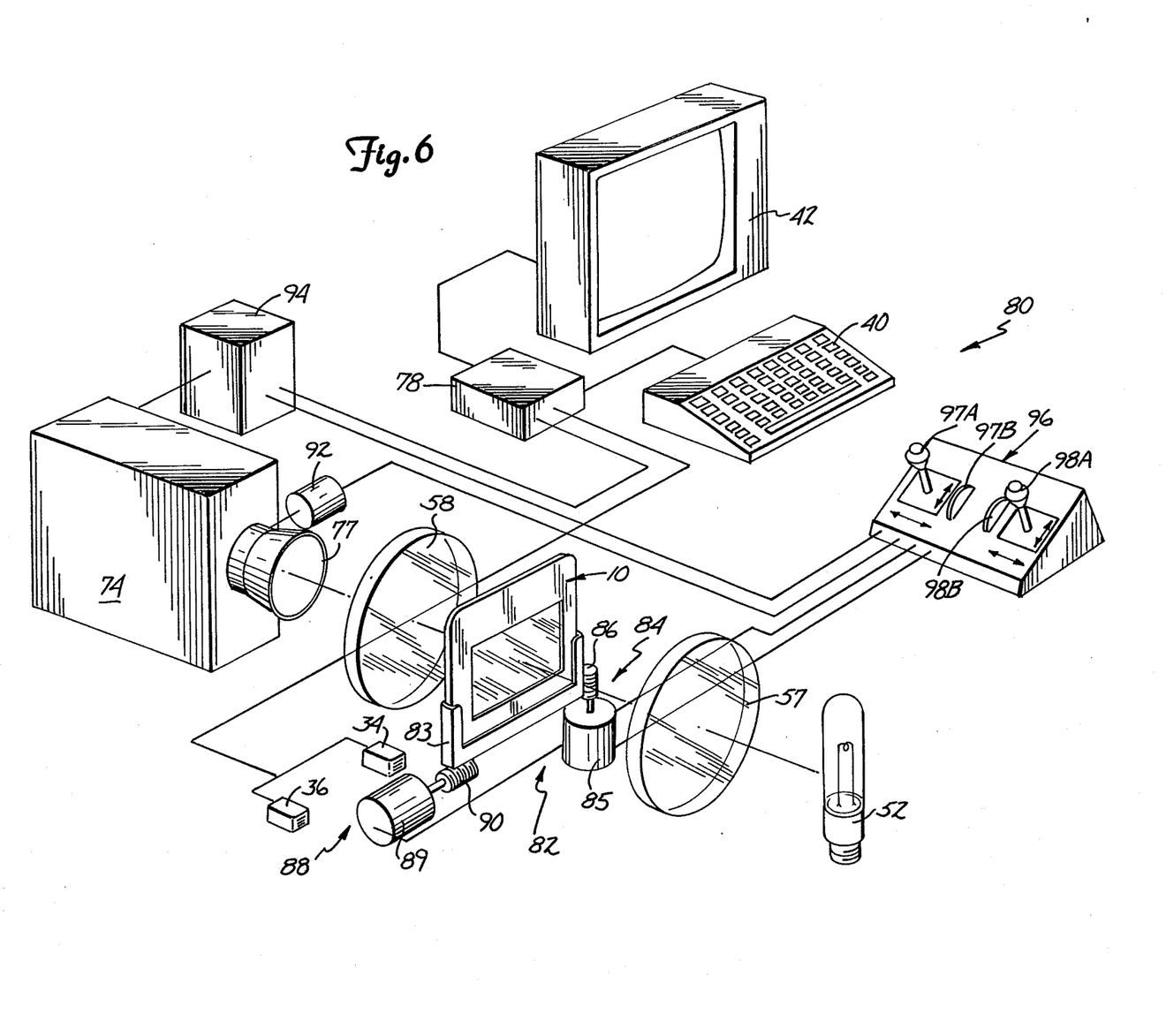
FIG. 6 is a schematic view of a read/write system having a cropping system for viewing selected portions of a photographic image for use with the information projector slide shown in FIG. 1.

In certain applications, it is desirable to having a cropping capability (i.e. to view and/or enlarge certain sectors or portions of an image mounted in photographic slide 10). A fifth preferred embodiment of the present invention, system 80, includes cropping system 82. Projector slide 10 is mounted in a slide holder 83. A vertical cropping drive 84 includes a motor 85 and a threaded spool or screw 86 associated with holder 83 so that rotation of screw 86 positions holder 83 to a desired vertical orientation. Likewise, a horizontal cropping drive 88 having a motor 89 and a threaded screw 90 associated with holder 83 is provided to position projector slide 10 at a desired horizontal orientation.

A light source such as lamp 52 illuminates projector slide 10 through diffuser 57 and lens 58 to video camera 74. Video camera 74 includes a zoom lens 77 actuated by a zoom drive 92. Video camera 74 can be interfaced with a conventional color inverter 94. Color inverter 94 permits the viewer to see negatives and true colors, therefore allowing system 80 to be used with either photographic slide positives or negatives.

A cropping and color controller 96 is also included within system 80. As shown, vertical cropping drive 84, horizontal cropping drive 88 and zoom drive 92 are interfaced with controller 96. Cropping drives 84 and 88 are actuated by a joystick 97A, and zoom drive 92 is actuated by a dial 97B. Color inverter 94 is also interfaced with controller 96 and controlled by a joystick 98A and dial 98B. Joystick 98A selects hue and tint, while dial 98B selects density. As used herein, color inversion is the process of accepting a signal or set of signals proportional to and representative of the relative intensity of a narrow band light source of specified wavelength and producing an output signal or set of signals inversely proportional to the input. It is to be understood that controls 97A and 97B for cropping drives 84 and 88 can be provided in a separate housing from color inverter controls 98A and 98B. Furthermore, other control devices are within the scope of the present invention.

An image from camera 74 is received by electronics 78. Electronics 78 is interfaced with keyboard 40. The image and information from projector slide 10 can be simultaneously displayed on monitor 42. Once settings for cropping and color are selected, such information is encoded onto magnetic medium 22 of projector slide 10. The selected settings are encoded through electronics 78, color inverter 94 and write head 34 in a manner described above.

Personal satisfaction with photography is based on the quality of the result. A basic flaw in amateur photography is standing back too far from the subject and improper cropping or formation of the picture. Surprisingly, professionals make the same mistake, but have an opportunity after-the-fact to enlarge and recrop in the enlarger. Amateurs do not have this opportunity unless they have their own darkroom.

The T.V. video slide/negative projector system 80 provides greater personal satisfaction with photography, as enlarging and recropping in the comforts of the home on the T.V. monitor are available. Encoding of this recropped image is recorded on the magnetic medium 12 on the projector slide 10 and can be used by the properly equipped photo lab to provide reprints and enlargements of this newly formatted picture.

The enclosed enlargement and X, Y location data can allow reshowing on the T.V. monitor 42 of the reformatted picture instead of the original image. Several reformatted pictures from the same projector slide 10 are possible, if the data is encoded for each.

As previously noted, with the present invention, magnetically stored data is used to identify and X-Y movement and enlargement of the reformatted image. This information will be used by the device itself when reshowing the reformatted image, and by modified enlarging printers used by photofinishers to generate reformatted prints and enlargements.

The magnetic data has many other uses as well, such as recording of color correction data, instruction information for photofinishers regarding size and number of desired prints, subject identification, date, location and retrieval data. The entire system leads itself to automatic storage and retrieval systems of mass data stored photographically on 2×2" slide mounts, with video and hard copy output capabilities.

Although the present invention has been described with reference to preferred embodiments, workers skilled in the art will recognize that changes may be made in form and detail without departing from the spirit and scope of the invention.

What is claimed is:

1. A method for concurrently displaying a photographic film image and alphanumeric information characteristic of the image, comprising:
    mounting a photographic film image on a projector slide;
    mounting a magnetic recording medium on the projector slide;
    digitally encoding alphanumeric information representative of image display;
    writing the digitally encoded alphanumeric information to the recording medium on the projector slide;
    reading the alphanumeric information from the projector slide;
    providing a visual display of the alphanumeric information read from the projector slide; and
    displaying an image from the photographic film image on the projector slide as a function of the alphanumeric information read from the slide.

2. The method of claim 1 wherein:
    digitally encoding alphanumeric information includes digitally encoding image cropping information;
    writing digitally encoded alphanumeric information includes writing digitally encoded image cropping information to the projector slide; and
    displaying the image includes displaying a cropped image as a function of the cropping information.

3. The method of claim 1 wherein:
    digitally encoding alphanumeric information includes digitally encoding image enlargement information;
    writing digitally encoded alphanumeric information includes writing digitally encoded image enlargement information to the projector slide; and
    displaying the image includes displaying an enlarged image as a function of the enlargement information.

4. The method of claim 1 wherein:
    digitally encoding alphanumeric information includes digitally encoding image color information;
    writing digitally encoded alphanumeric information includes writing digitally encoded image color information to the projector slide; and
    displaying the image includes displaying the image in color as a function of the image color information.

5. The method of claim 1 wherein writing the digitally encoded alpha-numeric information includes writing alpha-numeric information representative of a description of the photographic film image.

6. The method of claim 1 wherein writing the digitally encoded alpha-numeric information includes writing alpha-numeric information representative of the date the image was originated.

7. The method of claim 1 wherein writing the digitally encoded alpha-numeric information includes writing alpha-numeric information representative of the name of the photographer.

8. The method of claim 1 wherein writing the digitally encoded alpha-numeric information includes writing alpha-numeric information representative of the type of film used.

9. The method of claim 1 wherein writing the digitally encoded alpha-numeric information includes writing alpha-numeric information representative of a classification code.

10. A method for processing an image created from photographic film mounted within a projector slide, including:
    providing a projector slide having a photographic film with an image mounted therein and having a magnetic medium for storing alphanumeric information affixed thereon;
    writing alphanumeric processing information representative of desired image processing to the magnetic medium on the projector slide;
    creating an image from the photographic film mounted in the projector slide;
    reading the alphanumeric processing information from the magnetic medium on the projector slide; and
    processing the created image as a function of the processing information read from the magnetic medium of the projector slide in which the film is mounted.

11. The method of claim 10 wherein processing the created image includes printing the image as a function of the processing information read from the magnetic medium on the projector slide in which the film is mounted.

12. The method of claim 10 wherein:
    writing alphanumeric information includes writing alphanumeric image cropping information;
    reading the alphanumeric information includes reading alphanumeric image cropping information; and
    processing the created image includes cropping the image as a function of the alphanumeric cropping information read from the magnetic medium on the projector slide.

13. The method of claim 1 wherein:
    writing alphanumeric processing information includes writing alphanumeric image enlargement information to the magnetic medium;
    reading the alphanumeric information includes reading the alphanumeric information enlargement information from the magnetic medium; and
    processing the created image includes enlarging the image as a function of the image enlargement information read from the magnetic medium.

14. The method of claim 1, wherein:
writing alphanumeric processing information includes writing alphanumeric image color information representative of desired image color to the magnetic medium;
reading the alphanumeric information includes reading the alphanumeric image color information from the magnetic medium; and
processing the created image includes controlling color of the image as a function of the color information read from the magnetic medium.

* * * * *

UNITED STATES PATENT AND TRADEMARK OFFICE
CERTIFICATE OF CORRECTION

PATENT NO. : 4,765,734

DATED : August 23, 1988

INVENTOR(S) : James A. Truc et al.

It is certified that error appears in the above-identified patent and that said Letters Patent is hereby corrected as shown below:

Column 8, line 59, delete "claim 1" and insert --claim 10--.

Column 9, line 1, delete "claim 1" and insert --claim 10--.

Signed and Sealed this

Third Day of January, 1989

Attest:

DONALD J. QUIGG

*Attesting Officer*  *Commissioner of Patents and Trademarks*